United States Patent
Fiedler et al.

(10) Patent No.: US 8,392,102 B2
(45) Date of Patent: Mar. 5, 2013

(54) METHOD AND DEVICE FOR ESTIMATING THE HEIGHT OF THE CENTER OF GRAVITY OF A VEHICLE

(75) Inventors: Jens Fiedler, Thalmassing (DE); Rainer Marstaller, Ingolstadt (DE); Andreas Mayer, Freiburg (DE)

(73) Assignee: Continental Automotive GmbH, Hannover (DE)

( * ) Notice: Subject to any disclaimer, the term of this patent is extended or adjusted under 35 U.S.C. 154(b) by 845 days.

(21) Appl. No.: 12/442,653

(22) PCT Filed: May 25, 2007

(86) PCT No.: PCT/EP2007/055125
§ 371 (c)(1), (2), (4) Date: Sep. 11, 2009

(87) PCT Pub. No.: WO2008/037507
PCT Pub. Date: Apr. 3, 2008

(65) Prior Publication Data
US 2010/0036597 A1 Feb. 11, 2010

(30) Foreign Application Priority Data
Sep. 26, 2006 (DE) .......................... 10 2006 045 304

(51) Int. Cl.
*G06F 17/10* (2006.01)
*G06G 7/48* (2006.01)
(52) U.S. Cl. ..................................................... 701/124
(58) Field of Classification Search .................... 701/124
See application file for complete search history.

(56) References Cited

U.S. PATENT DOCUMENTS

| | | | | |
|---|---|---|---|---|
| 4,773,012 A | * | 9/1988 | Ito et al. | 701/42 |
| 5,408,411 A | * | 4/1995 | Nakamura et al. | 701/48 |
| 5,684,719 A | * | 11/1997 | Anagnost | 702/153 |
| 5,825,284 A | * | 10/1998 | Dunwoody et al. | 340/440 |
| 6,002,975 A | * | 12/1999 | Schiffmann et al. | 701/36 |
| 6,192,305 B1 | * | 2/2001 | Schiffmann | 701/45 |

(Continued)

FOREIGN PATENT DOCUMENTS

| | | |
|---|---|---|
| DE | 4217710 | 12/1993 |
| DE | 19904216 | 1/2000 |

(Continued)

OTHER PUBLICATIONS

International PCT Search Report, PCT/EP2007/055125, 4 pages, Mailed Sep. 20, 2007.

*Primary Examiner* — Khoi Tran
*Assistant Examiner* — Bhavesh V Amin
(74) *Attorney, Agent, or Firm* — King & Spalding L.L.P.

(57) ABSTRACT

In a method for estimating the height of the center of gravity of a vehicle, a lateral acceleration is determined. Predefined first and second driving situation are detected at a first time as a function of a determined roll rate or of a determined roll angle and at a second time as a function of the roll rate or of the roll angle. In a time period delimited by the first and second times, a differential angle by which a vehicle body tilts during the time period is determined. Also determined are an angular speed: formula and an angular acceleration: formula of the vehicle tilting movement in the time period. A height of the center of gravity of the vehicle is estimated on the basis of an equation of motion as a function of the lateral acceleration, of the differential angle, of the angular speed: formula and of the angular acceleration: formula.

20 Claims, 3 Drawing Sheets

U.S. PATENT DOCUMENTS

| | | | |
|---|---|---|---|
| 6,263,261 B1 * | 7/2001 | Brown et al. | 701/1 |
| 6,452,487 B1 * | 9/2002 | Krupinski | 340/440 |
| 7,263,436 B2 * | 8/2007 | Verhagen et al. | 701/124 |
| 7,526,376 B2 * | 4/2009 | Huang et al. | 701/124 |
| 2002/0087235 A1 * | 7/2002 | Aga et al. | 701/1 |
| 2002/0109310 A1 * | 8/2002 | Lim | 280/5.508 |
| 2004/0133338 A1 * | 7/2004 | Verhagen et al. | 701/124 |
| 2005/0184475 A1 * | 8/2005 | Hamm | 280/5.502 |
| 2006/0129291 A1 * | 6/2006 | Lu et al. | 701/36 |
| 2007/0179735 A1 * | 8/2007 | Fiedler et al. | 702/150 |

FOREIGN PATENT DOCUMENTS

| | | |
|---|---|---|
| DE | 10135020 | 2/2003 |
| DE | 10247993 | 4/2004 |

\* cited by examiner

METHOD AND DEVICE FOR ESTIMATING THE HEIGHT OF THE CENTER OF GRAVITY OF A VEHICLE

CROSS-REFERENCE TO RELATED APPLICATIONS

This application is a United States national phase filing under 35 U.S.C. §371 of International Application No. PCT/EP2007/055125, filed May 25, 2007 which claims priority to German Patent Application No. 10 2006 045 304.2, filed Sep. 26, 2006. The complete disclosure of the above-identified application is hereby fully incorporated herein by reference.

TECHNICAL FIELD

The invention relates to a method and a device for estimating the height of the center of gravity of a vehicle based on operating values recorded during the trip.

BACKGROUND

Operating values recorded during the trip are entered into the rollover identification systems of motor vehicles. From the operating values, the possibility of the vehicle rolling over can be identified. Suitable safety measures are taken against this.

Vehicle parameters such as the mass of the vehicle or its height of the center of gravity are also included In rollover identification. These parameters are usually taken as being constant over the service life of the vehicle. For sport vehicles in the case of which only a small variation in these parameters takes place, this procedure is justified. However, the situation is for example different for off-road vehicles. Off-road vehicles are also referred to as Sports Utility Vehicles or SUVs for short. Variations in the mass of the vehicle of up to and including 25% as well as variations in the height of the center of gravity by approximately 10% are not unusual in the case of off-road vehicles.

Estimating the height of the center of gravity for the purposes of rollover identification is already known in DE 19918597 A1. Therein a method is described for reducing the risk of tilting of vehicles. The method involves continuously determining a tilt coefficient of the vehicle and comparing it with a predefined threshold value. If said threshold value is exceeded a steering intervention is automatically performed, which depends on the tilting stability determined. At the beginning of each trip, the height of the center of gravity of the vehicle is estimated and the value stored.

DE 3222149 C2 describes a device for avoiding the sideways tilting of a vehicle. The vehicle concerned is a gantry crane for transporting large containers. The device calculates the height of the total center of gravity of the vehicle. For calculating the height of the total center of gravity the weight of the gantry crane is taken as known. The height of the container as well as the weight of the container are in each case determined by means of a measuring device. The height of the total center of gravity is determined from the weight of the gantry crane, the height of the center of gravity of the gantry crane, the weight of the container as well as the height of the center of gravity of the container.

DE 4416991 A1 describes a method and a facility for warning of the danger of tilting when a truck is negotiating a curve. To this end, before the vehicle is driven into a curve, the type of vehicle and the condition data relevant to the tilting risk on driving through this curve, such as the weight of the vehicle and the speed of the vehicle are recorded. The risk of tilting on driving through the curve with the recorded speed of the vehicle is determined as a function of the center of gravity of the mass of the vehicle and of the curve radius and at least one signal is transmitted in the case of an increased speed and a risk of tilting determined. In a section of the route which is as straight as possible ahead of a curve, wheel load sensors are provided in a line at right angles to the driving direction. The total weight is recorded by adding up the wheel loads determined in the individual wheel load sensors. In addition, provision has been made for a sensor ahead of the curve by means of which the height and the height contours of the vehicle in question can be recorded. In this way, as a function of the total weight of the vehicle, of the height and of the height contour of which as well as by means of predefined data for the specified type of vehicle, a weight-dependent estimation can be made of the height position of the center of gravity of the vehicle.

SUMMARY

According to various embodiments, an improved estimation of the height of the center of gravity can be provided both for a method and for a facility.

According to an embodiment, a method for estimating the height of the center of gravity of a vehicle, may comprise the steps of —Determining a lateral acceleration of the vehicle; —Detecting a predefined first driving situation at a first point in time as a function of a determined roll rate or of a determined roll angle of the vehicle; —Detecting a predefined second driving situation at a second point in time as a function of the determined roll rate or of the determined roll angle of the vehicle; —Determining a differential angle by means of which a vehicle body of the vehicle tilts during a period of time, with the period of time being delimited by the first and the second point in time; —Determining an angular speed of the tilting in a period of time; —Determining an angular acceleration of the tilting in a period of time; and —Estimating the height of a center of gravity of the vehicle based on an equation of motion as a function of the lateral acceleration, of the differential angle, of the angular speed and of the angular acceleration.

According to a further embodiment, the method may comprise the step of, on detection of the first driving situation, recording whether or not the roll rate exceeds or falls below a predefined first threshold and wherein, on detection of the second driving situation, recording whether or not the roll rate exceeds or falls below a predefined second threshold. According to a further embodiment, the method may comprise the step of, on detection of the first driving situation and the second driving situation recording whether or not the roll rate disappears or almost disappears. According to a further embodiment, the method may comprise the step of, on detection of the first driving situation and the second driving situation, detecting in each case whether or not the roll angle reaches a local extreme value. According to a further embodiment the differential angle can be recorded by integrating the roll rate in the period of time. According to a further embodiment the angular acceleration can be recorded by deriving the roll rate in the period of time. According to a further embodiment, the method may comprise the step of recording as a function of a recorded operating value whether or not the vehicle is traveling on a sloped driving surface, and estimating the height of the center of gravity is only carried out when the slope of the driving surface does not exceed a predefined angle. According to a further embodiment, the method may comprise the step of detecting as a function of a recorded operating value whether or not the vehicle is carrying out a quasi-stationary circular trip, and estimating the height of the center of gravity is only carried out when no quasi-stationary circular trip is detected. According to a further embodiment, recording the quasi-stationary circular trip may comprise comparing the difference between a recorded first acceleration signal, which exhibits at least one acceleration component vertical to a vertical axis of the vehicle and a second acceleration signal that comprises the filtered first acceleration signal with a predefined limit value to determine whether or not the amount of the difference is below the predefined limit value. According to a further embodiment, the filtering may comprise Chebyshev filtering. According to a further embodiment, the comparison in each case may take place repeatedly at intervals and a counter may be set as a function of the comparison that has been made. According to a further embodiment, in order to detect the quasi-stationary circular trip, a comparison may be made to determine whether or not the counter exceeds a predefined limit value. According to a further embodiment, the acceleration component can be the recorded lateral acceleration. According to a further embodiment, a further acceleration component can be recorded in order to detect the quasi-stationary circular trip, which is a recorded longitudinal acceleration of the vehicle. According to a further embodiment, a mass of the vehicle can be estimated as a function of a recorded operating value, with the mass being included in the equation of motion. According to a further embodiment, changes in the vehicle body can be determined over distance relative to the wheel suspensions of a chassis of the vehicle and the roll rate is determined by means of changes over distance. According to a further embodiment, the estimated height of the center of gravity can be used for a rollover identification.

According to another embodiment, a device for estimating the height of the center of gravity of a vehicle may comprise: —a sensor operable to determine a lateral acceleration of the vehicle; —a detector operable to detect a predefined first driving situation at a first point in time as a function of a determined roll rate or of a determined roll angle of the vehicle and to detect a predefined second driving situation at a second point in time as a function of the determined roll rate or of the determined roll angle of the vehicle; —a roll angle unit operable to determine a differential angle that tilts a vehicle body of the vehicle in a period of time, with the period of time being delimited by the first and the second point in time; —a roll rate unit operable to determine an angular speed of the tilting in the period of time; —a roll acceleration unit operable to determine an angular acceleration of the tilting in the period of time; and —an estimation unit, which is embodied to estimate the height of the center of gravity of the vehicle on the basis of an equation of motion as a function of the lateral acceleration, of the differential angle, of the angular speed and of the angular acceleration.

BRIEF DESCRIPTION OF THE DRAWINGS

The invention is described below with reference to the exemplary embodiments specified in the schematic figures of the drawing, in which.

DETAILED DESCRIPTION

According to various embodiments, provision has been made for a method and a corresponding facility for estimating the height of the center of gravity of a vehicle. The lateral acceleration of the vehicle is determined. A predefined first driving situation is detected as a function of a determined roll rate or of a determined roll angle of the vehicle. In addition, a predefined second driving situation is detected at a second point in time as a function of the determined roll rate or of the determined roll angle of the vehicle. In a period of time delimited by the first and second point in times, a differential angle by which a vehicle body of the vehicle tilts during the period of time is determined. In addition, an angular speed of the tilting and an angular acceleration of the tilting are determined in the period of time. A height of the center of gravity of the vehicle is estimated as a function of the lateral acceleration, of the differential angle, of the angular speed and of the angular acceleration.

An advantage of this arrangement is that the differential angle the angular speed and the angular acceleration are closely related so that it is sufficient to identify one of these three parameters by sensor in order to be able to determine the others. This means that the cost of sensors for estimating the height of the center of gravity is very low since only the lateral acceleration of the vehicle additionally has to be recorded.

In an embodiment, during the detection of the first driving situation it is recorded whether or not the roll rate exceeds or is below a predefined first threshold and during the detection of the second driving situation it is recorded whether or not the roll rate is below or exceeds a predefined second threshold. These limit value analyses are accompanied by a simple development of the sensor or the sensors for the detection of the driving situations.

Advantageously, during the detection of the first driving situation and the second driving situation it is recorded whether or not the roll rate disappears or nearly disappears. In this way, driving the vehicle from a straight section into a curve up to the apex of the curve is detected or, vice versa, driving out of the curve from the apex is detected.

In a further embodiment, it is detected whether or not the angle of tilt reaches a local extreme value in order to detect the above situations.

Advantageously the roll rate is determined by means of a suitable sensor, which is also referred to as a roll rate sensor. In this case, the differential angle is detected by integrating the roll rate over the period of time.

In the advantageous use of the same sensor, the angular acceleration is recorded by deriving the roll rate in the period of time.

In order to be able to use an equation of motion, it is detected in an embodiment as a function of a recorded operating value whether or not the vehicle is traveling on a sloped driving surface. The equation of motion is described in detail below. The height of the center of gravity is only estimated when the slope of the driving surface does not exceed a given angle in order to eliminate estimating errors originating from the slope.

Advantageously is detected whether or not the vehicle performs a quasi-stationary circular trip as a function of a recorded operating value. An estimation of the height of the center of gravity is only carried out if no quasi-stationary circular trip takes place because the quasi-stationary circular trip significantly extends the period of time within which the operating values are determined for the equation of motion.

Advantageously, in order to detect the quasi-stationary circular trip, a comparison is made to determine whether or not the difference between a first acceleration signal detected, which exhibits at least one acceleration component at right angles to the vertical axis of the vehicle, and a second acceleration signal, which includes the filtered first acceleration signal is less than a predefined limit value. The filtering is usually a delay so that it can be seen from the comparison whether or not the acceleration is almost constant, which suggests the quasi-stationary circular trip.

The filtering is advantageously carried out by means of a Chebyshev filter which makes possible an exact adjustment of the delay to be measured.

The regular checking in respect of the quasi-stationary circular trip is advantageously carried out by the comparison being made regularly in each case at intervals and a counter being set as a function of the comparison that has been made.

In an embodiment, provision has been made for an easy detection by comparing the counter with a predefined limit value by means of which the quasi-stationary circular trip is shown.

In an embodiment, the acceleration component is the recorded lateral acceleration so that it is possible to revert to the acceleration sensor for which provision has already been made.

In an embodiment, the longitudinal acceleration of the vehicle is also used as an acceleration component for the detection of the quasi-stationary circular trip to increase the accuracy.

In addition, the accuracy of the estimation of the height of the center of gravity is further increased in an embodiment when the mass of the vehicle, which is entered into the equation of motion, is estimated as a function of a detected operating value.

An embodiment for ensuring the accuracy of the roll rate information makes provision for determining changes in the vehicle body over distance relative to the wheel suspension of the chassis or for determining the roll rate by means of the changes over distance.

Figure 1:
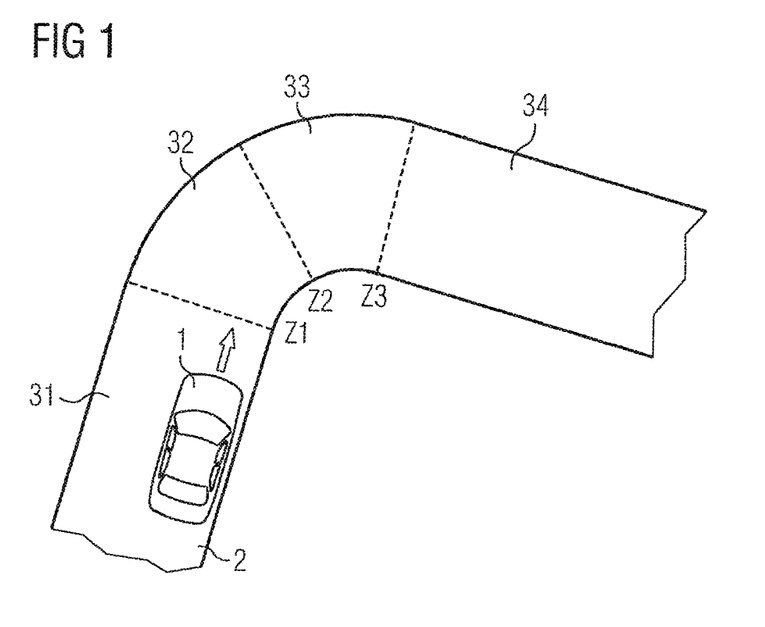
FIG. 1 shows a top view of a vehicle when driving into a curve.

FIG. 1 shows a top view of a vehicle 1, which travels on a driving surface 2. The driving surface 2 has a curve and can be divided into four areas. A first area 31 comprises a straight driving surface section. A second area 32 comprises the area from driving into a curve Z1 up to an apex Z2 of the curve. The third area 33 extends from the apex Z2 up to driving out of the curve Z3, followed by a further straight driving surface section 34. The curve is curved in such a way that the curve radius decreases up to the apex Z2 and then increases again.

On driving the vehicle 1 into the curve and on entering the curve Z1, a lateral acceleration acting on a vehicle 1 occurs because of driving the vehicle in a curve. With the decreasing curve radius, the lateral acceleration also increases until the apex Z2 is reached. In the case of the driving out of the curve, the curve radius and the lateral acceleration acting on the vehicle 1 increase. In the case of the straight driving out of the curve, there is no lateral acceleration.

Figure 2:
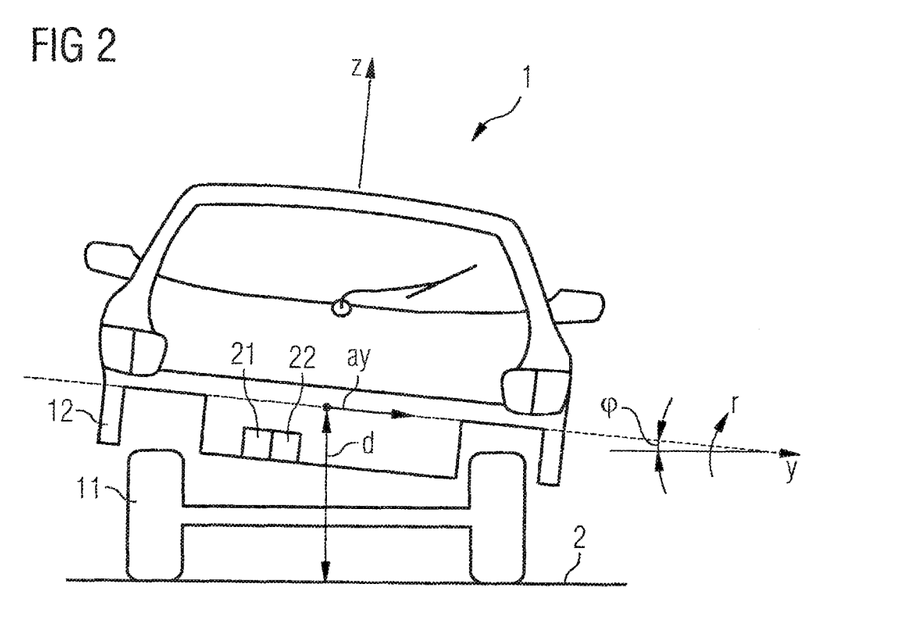
FIG. 2 shows a cross-section of the vehicle on being driven into a curve.

FIG. 2 shows the vehicle 1 being driven into a curve on a level driving surface 2. The vehicle 1 has a vehicle body 12 and a chassis 11. A transverse axis y of the vehicle and a vertical axis z of the vehicle are referred to the vehicle body 2. Provision has been made for a lateral acceleration sensor 21 as well as a roll rate sensor 22 in the vehicle 1. Because of the manner in which it is mounted in the vehicle body 12, the lateral acceleration sensor 21 records the lateral acceleration ay in the direction of the transverse axis y of the vehicle.

The lateral acceleration originating from driving the vehicle into a curve goes along with a transverse force, which brings about a tilting by an angle of tilt φ of the vehicle body 12 referred to the chassis 11. The angle of tilt φ is also referred to as the roll angle. While driving on a level driving surface 2, said angle of tilt φ also indicates the tilting of the vehicle body 12 referred to the driving surface 2.

During the tilting, the lateral acceleration ay recorded by the lateral acceleration sensor 21 also has a small component in the direction of gravity as well as a main component at right angles to it.

The roll rate sensor 22 records a roll rate r, which comprises a roll angle speed of the tilting.

A height of the center of gravity d of the vehicle 1 is recorded based on the determined lateral acceleration ay, or its main component and the roll rate r.

Figure 3:
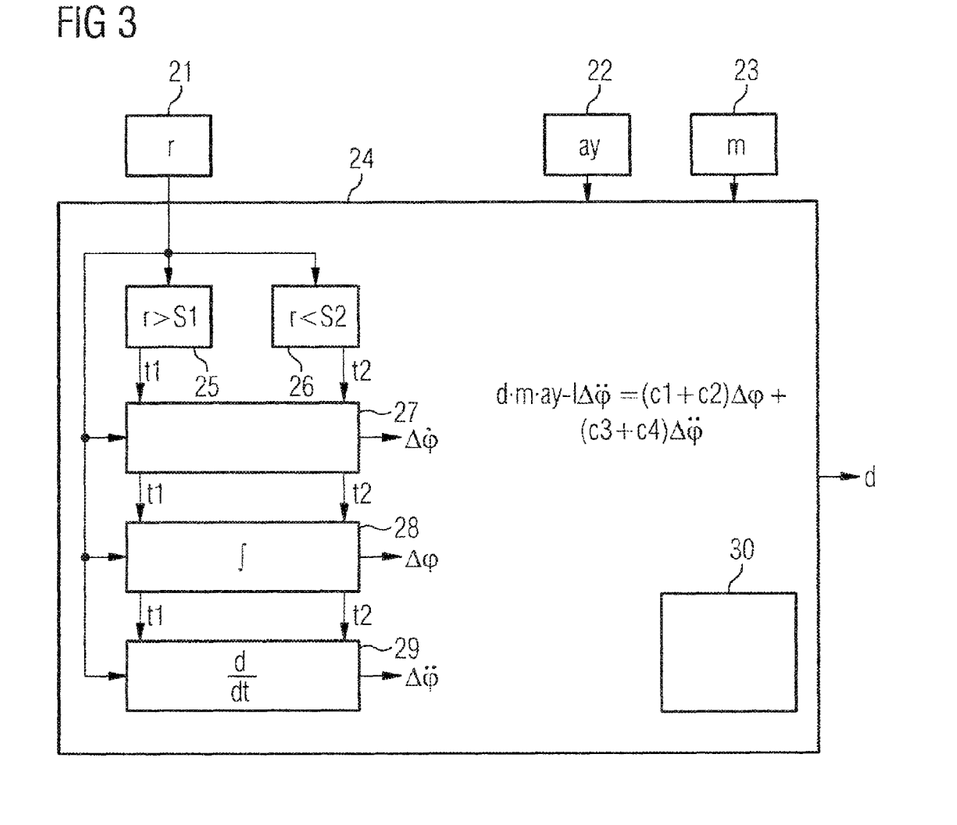
FIG. 3 shows a device for estimating the height of the center of gravity.

FIG. 3 shows a diagram of a device 24 for estimating the height of the center of gravity.

The device 24 for estimating the height of the center of gravity is coupled with the roll rate sensor 21, the lateral acceleration sensor 22 as well as a means 23 for providing the mass m of the vehicle. The mass m of the vehicle 1 can be assumed to be fixed. However, it is also conceivable that the means 23 is embodied as a mass estimator, which estimates the mass m as a function of a recorded operating parameter of the vehicle 1.

Estimating the height of the center of gravity takes place by means of an equation of motion, which in each case takes into consideration a current angle of tilt $\Delta\phi$ around a roll axis of a vehicle as well as a current angular speed $\Delta\dot\phi$ and a current angular acceleration $\Delta\ddot\phi$ of the tilting.

In general, the equation can be written as follows $$d \cdot m \cdot ay - I \cdot \Delta\ddot\phi = c1 \cdot \Delta\phi + c2 \cdot \Delta\dot\phi.$$

In this process, d is the distance of the center of gravity from the roll axis. I is the inertia moment with regard to the roll axis. c1 and c2 are vehicle-specific constants. By means of a well-known geometry, the constants c1, c2 as well as the inertia moment I can be determined. It is noted that the inertia moment I can be adjusted on the basis of the estimation of the mass. m is the mass of the vehicle body.

The current angle of tilt $\Delta\phi$ is a differential angle between an angle of tilt determined at a first point in time t1 and an angle of tilt determined at a second point in time t2. The same applies to the current angular speed $\Delta\dot\phi$ as well as to the current angular acceleration $\Delta\ddot\phi$.

The current angular speed $\Delta\dot\phi$ is determined by the roll rate sensor. The current angle of tilt $\Delta\phi$ is determined by integrating the roll rate r. The integration starts at a first point in time t1 and ends at a second point in time t2. The current angular acceleration $\Delta\ddot\phi$ is determined by deriving the determined roll rate r accordingly.

The first point in time t1 is determined by detecting a predefined first driving situation. Such a predefined driving situation is for example the driving of a vehicle Z1 into the curve. This first driving situation can be detected by the beginning of a rolling or the beginning of a tilting being detected by means of the roll rate r or the angle of tilt φ.

The second point in time t2 is detected by means of a second predefined driving situation. This for example comprises driving the vehicle through the apex (Z2) of the curve. This can be detected by means of a disappearing roll rate r at a maximal angle of tilt φ or by means of the local maximum of the angle of tilt φ.

The current angle of tilt determined in the period of time between the first and the second point in times t1, t2 as well as the current angular speed and the current angular acceleration $\Delta\phi, \Delta\dot\phi, \Delta\ddot\phi$ are used in the equation of motion.

This is also shown schematically in FIG. 3. Provision has been made for a first detector 25 or a second detector 26 in order to detect the first predefined driving situation and the second predefined driving situation. The first detector detects whether or not the roll rate r exceeds a predefined first threshold S1 and a second detector 26 detects whether or not the roll rate R falls below a predefined second threshold S2.

When driving of the vehicle into a curve up to the apex is subsequently detected the roll rate r between driving the vehicle into the curve Z1 and the apex Z2 initially increases proportionally and then decreases again. The same applies for driving the vehicle out of the curve from the apex Z2. In this way, the first, and the second threshold S1, S2 can be set in terms of amount just above the disappearing roll rate r.

The detected point in times t1 and t2 give the period of time in which the current angle of tilt, the current angular speed, and the current angular acceleration $\Delta\phi, \Delta\dot\phi, \Delta\ddot\phi$ are determined. For this purpose, the roll rate r is determined at a first point in time t1 and at a second point in time t2 and the current angular speed $\Delta\dot\phi$ is determined with a roll rate unit 27 acting as a subtractor. In order to determine the current angle of tilt $\Delta\phi$ and the current angular acceleration $\Delta\ddot\phi$, provision has been made for a roll angle unit 28 as the integrator or a roll acceleration unit 29 as the differentiator.

As an alternative, the current angle of tilt $\Delta\phi$ can also be evaluated by means of spring deflection sensor signals in an approximation method. In this process, advantage is taken of the fact that the distance between the vehicle body 12 and the chassis 11 changes when the vehicle is driven into a curve.

An, if required, eccentric mass distribution of a vehicle 1 can be identified by means of the fact that when the vehicle is standing still or when the vehicle is being driven straight ahead, an average spring deflection sensor value is determined for each spring deflection sensor. On condition, that all the springs of the vehicle bear a load in the linear spring characteristic curve area, an offset compensation of the spring deflection sensor signals is carried out.

The determined values $\Delta\phi, \Delta\dot\phi, \Delta\ddot\phi$ are used in the equation of motion and for determining the height of the center of gravity d, the equation of motion is solved in accordance with the height of the center of gravity d.

However, it is not required that the driving situations to be detected are limited to vehicles driving into curves and to vehicles driving out of curves. It is merely necessary that only situations with a roll rate signal deviating from zero are permitted. Should the amount of the roll rate signal exceed a predefined amount; the integration of the roll rate signals is started. In this process, only driving conditions are taken into consideration in which the rate of the roll rate signal does not exceed a predefined threshold value. As soon as the roll rate signal has reached a predefined threshold, the integration of the roll rate signal is stopped. The resulting current angle of tilt as well as the current angular speed and the current angular acceleration $\Delta\phi, \Delta\dot\phi, \Delta\ddot\phi$, are used in the equation of motion. An advantage of this method is the fact that by means of this extension of the situation identification, a quicker determination of the height of center of gravity takes place.

By forming a suitable mean, varying load conditions can also be identified in a reliable manner.

It is noted that in order to determine the height of the center of gravity, only situations in which the vehicle 1 is moving along a level driving surface 2 are used, that is no driving surface with a lateral slope or a driving surface with a longitudinal slope is identified because otherwise the above equation of motion leads to errors when determining the height of the center of gravity.

Such a situation in which the driving surface has a lateral slope or a longitudinal slope can for example be identified by means of a situation detector 30, which prevents the output of the height of the center of gravity d that can be assumed to be false in such a case.

In addition, estimating the height of the center of gravity is also not carried out during quasi-stationary circular trips. This can also be identified by means of a situation detector 30.

Figure 4:
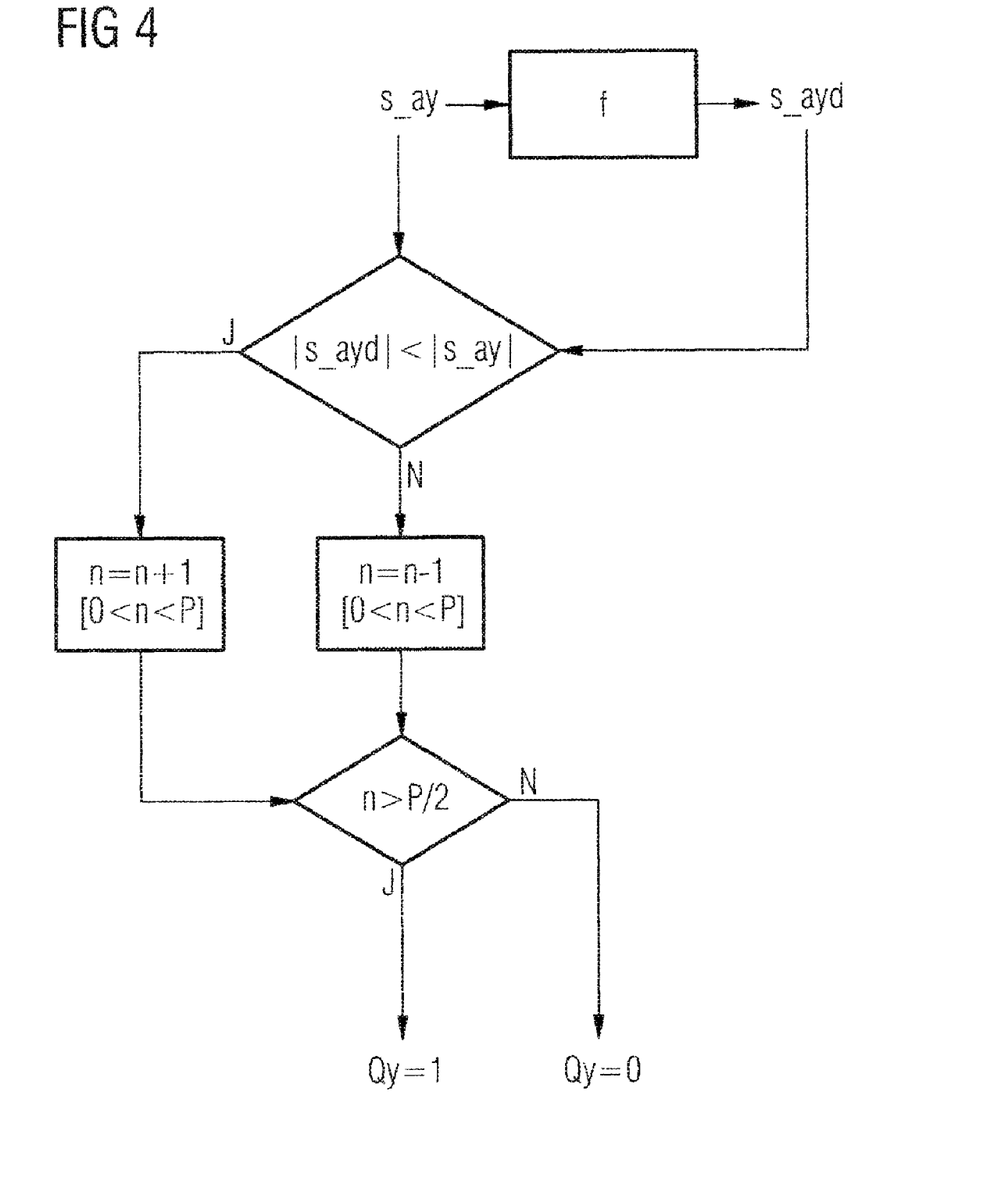
FIG. 4 shows a diagram which illustrates the detection of a quasi-stationary circular trip.

FIG. 4 shows by means of a diagram the procedure in order to detect the quasi-stationary circular trip. This driving situation is identified in the simplest case by comparing an unfiltered lateral acceleration signal s_ay and a filtered, time-delayed lateral acceleration signal s_ayd to each other. If the unfiltered lateral acceleration signal s_ay, deviates from the filtered lateral acceleration signal s_ayd, a situation counter n is set accordingly.

Filtering the lateral acceleration signal s_ay can be carried out by means of a Chebyshev filter function f. The resulting, filtered lateral acceleration signal s_ayd is compared to the unfiltered lateral acceleration signal s_ay. If the difference between the filtered and the unfiltered lateral acceleration signal s_ayd, s_ay is less in terms of amount than a limit value G, a counter n is incremented by 1. Otherwise, this counter n is decremented by 1. However, in order to delimit the value range of the counter, n is only changed in the range between 0 and a limit value P. Further incrementations or decrementations outside this range are not taken into consideration.

By means of a simple limit value comparison, namely whether or not n is greater than P/2, a quasi-stationary circular trip is decided upon. If the above case has been met, a flag Qy=1 is set and otherwise Qy=0 is set. Needless to say, the flag can also be set in the reverse manner.

In addition a test can be performed to determine whether or not a longitudinal acceleration signal appropriately fulfills the above conditions. Also in this case, the difference between the unfiltered and the filtered longitudinal acceleration signal is compared to determine whether or not it is in terms of amount smaller than a limit value, and a second counter m is, if this is the case, incremented and otherwise decremented. In this case, the value range of the second counter m is also limited. A second flag is set in accordance with the above-mentioned specifications.

In this way, the accuracy of the quasi-stationary detection of driving a vehicle into a curve can be increased because not only the lateral acceleration, but also the longitudinal acceleration that leads to a pitching motion of the vehicle is included in the detection.

The quasi-stationary driving of a vehicle into a curve is detected when both flags have been set.

The estimated height of the center of gravity d can be used in a roll-over identification, which for example in addition to the height of the center of gravity also takes into consideration the mass of the vehicle as well as, if required, driving along a sloped driving surface. The center of gravity of the vehicle determined in such a way can also be used in a reliable manner for recording other condition parameters such as for example the driving surface slope.

In this way, a combination of estimating the mass, subsequent estimation of the height of the center of gravity and a later detection of the driving surface slope can provide reliable values for a rollover identification.

The invention claimed is:

1. A method for estimating the height of the center of gravity of a vehicle, using a device in communication with one or more sensors or detectors, the method comprising:
   determining a lateral acceleration of the vehicle;
   detecting a predefined first driving situation at a first point in time as a function of a determined roll rate or of a determined roll angle of the vehicle;
   detecting a predefined second driving situation at a second point in time as a function of the determined roll rate or of the determined roll angle of the vehicle;
   determining a differential angle by means of which a vehicle body of the vehicle tilts during a period of time, with the period of time being delimited by the first and the second point in time;
   determining an angular speed of the tilting in a period of time;
   determining an angular acceleration of the tilting in a period of time;
   determining if the vehicle is carrying out a quasi-stationary trip by comparing a difference between a recorded first acceleration signal, which exhibits at least one acceleration component vertical to a vertical axis of the vehicle and a second acceleration signal that comprises the filtered first acceleration signal with a predefined limit value to determine whether or not the amount of the difference is below the predefined limit value; and
   estimating the height of a center of gravity of the vehicle based on an equation of motion as a function of the lateral acceleration, of the differential angle, of the angular speed and of the angular acceleration when no quasi-stationary circular trip is detected.

2. The method according to claim 1, comprising the step of, on detection of the first driving situation, recording whether or not the roll rate exceeds or falls below a predefined first threshold and wherein, on detection of the second driving situation, recording whether or not the roll rate exceeds or falls below a predefined second threshold.

3. The method according to claim 1, comprising the step of, on detection of the first driving situation and the second driving situation recording whether or not the roll rate disappears or almost disappears.

4. The method according to claim 1, comprising the step of, on detection of the first driving situation and the second driving situation, detecting in each case whether or not the roll angle reaches a local extreme value.

5. The method according to claim 1, wherein the differential angle is recorded by integrating the roll rate in the period of time.

6. The method according to claim 1, wherein the angular acceleration is recorded by deriving the roll rate in the period of time.

7. The method according to claim 1, comprising the step of recording as a function of a recorded operating value whether or not the vehicle is traveling on a sloped driving surface, and estimating the height of the center of gravity is only carried out when the slope of the driving surface does not exceed a predefined angle.

8. The method according to claim 1, comprising the step of detecting as a function of a recorded operating value whether or not the vehicle is carrying out a quasi-stationary circular trip, and estimating the height of the center of gravity is only carried out when no quasi-stationary circular trip is detected.

9. A method for estimating the height of the center of gravity of a vehicle using a device in communication with one or more sensors or detectors, comprising:
   determining a lateral acceleration of the vehicle;
   detecting a predefined first driving situation at a first point in time as a function of a determined roll rate or of a determined roll angle of the vehicle;
   detecting a predefined second driving situation at a second point in time as a function of the determined roll rate or of the determined roll angle of the vehicle;
   determining a differential angle by means of which a vehicle body of the vehicle tilts during a period of time, with the period of time being delimited by the first and the second point in time;
   determining an angular speed of the tilting in a period of time;
   determining an angular acceleration of the tilting in a period of time; and
   estimating the height of a center of gravity of the vehicle based on an equation of motion as a function of the lateral acceleration, of the differential angle, of the angular speed and of the angular acceleration; and
   detecting as a function of a recorded operating value whether or not the vehicle is carrying out a quasi-stationary circular trip, and estimating the height of the center of gravity is only carried out when no quasi-stationary circular trip is detected;
   wherein recording the quasi-stationary circular trip comprises comparing the difference between a recorded first acceleration signal, which exhibits at least one acceleration component vertical to a vertical axis of the vehicle and a second acceleration signal that comprises the filtered first acceleration signal with a predefined limit value to determine whether or not the amount of the difference is below the predefined limit value.

10. The method according to claim 9, wherein the filtering comprises Chebyshev filtering.

11. The method according to claim 9, wherein the comparison in each case takes place repeatedly at intervals and a counter is set as a function of the comparison that has been made.

12. The method according to claim 11, wherein, in order to detect the quasi-stationary circular trip, a comparison is made to determine whether or not the counter exceeds a predefined limit value.

13. The method according to claim 8, wherein the acceleration component is the recorded lateral acceleration.

14. The method according to claim 13, wherein a further acceleration component is recorded in order to detect the quasi-stationary circular trip, which is a recorded longitudinal acceleration of the vehicle.

15. The method according to claim 1, wherein a mass of the vehicle is estimated as a function of a recorded operating value, with the mass being included in the equation of motion.

16. The method according to claim 1, wherein changes in the vehicle body are determined over distance relative to the wheel suspensions of a chassis of the vehicle and the roll rate is determined by means of changes over distance.

17. The method according to claim 1, wherein the estimated height of the center of gravity is used for a rollover identification.

18. A device for estimating the height of the center of gravity of a vehicle comprising:
   a sensor configured to determine a lateral acceleration of the vehicle, wherein the device is configured to determine if the vehicle is in a quasi-stationary circular trip by comparing the lateral acceleration with a filtered lateral acceleration;

a detector configured to detect a predefined first driving situation at a first point in time as a function of a determined roll rate or of a determined roll angle of the vehicle and to detect a predefined second driving situation at a second point in time as a function of the determined roll rate or of the determined roll angle of the vehicle;

a roll angle unit configured to determine a differential angle that tilts a vehicle body of the vehicle in a period of time, with the period of time being delimited by the first and the second point in time;

a roll rate unit configured to determine an angular speed of the tilting in the period of time;

a roll acceleration unit configured to determine an angular acceleration of the tilting in the period of time; and an estimation unit, which is configured to estimate the height of the center of gravity of the vehicle on the basis of an equation of motion as a function of the lateral acceleration, of the differential angle, of the angular speed and of the angular acceleration when no quasi-stationary circular trip is detected.

19. The device according to claim 18, further being configured, on detection of the first driving situation, to record whether or not the roll rate exceeds or falls below a predefined first threshold and, on detection of the second driving situation, to record whether or not the roll rate exceeds or falls below a predefined second threshold.

20. The device according to claim 18, further being configured, on detection of the first driving situation and the second driving situation, to record whether or not the roll rate disappears or almost disappears.

* * * * *